United States Patent

[11] 3,622,481

[72] Inventors Everett R. Johnson
 Chevy Chase, Md.;
 Edwin N. Ladov, Maple Shade, N.J.
[21] Appl. No. 874,031
[22] Filed Nov. 4, 1969
[45] Patented Nov. 23, 1971
[73] Assignee The United States of America as
 represented by the United States Atomic
 Energy Commission

[54] METHOD OF PRODUCING COMPOUNDS ENRICHED IN OXYGEN-18
 5 Claims, No Drawings
[52] U.S. Cl. .................................................... 204/157.1
[51] Int. Cl. .................................................... B01j 1/10

[50] Field of Search ........................................... 204/157.1 H

[56] References Cited
OTHER REFERENCES
Cunningham, Jour. Phy. Chem. 65 (1961) pp. 628–635

*Primary Examiner*—Howard S. Williams
*Attorney*—Roland A. Anderson

ABSTRACT: A method of increasing the oyxgen-18 concentration in a compound containing oxygen and nitrogen comprising irradiating $KNO_3$ with high energy radiation until at least 10 mole percent of said $KNO_3$ is decomposed into $KNO_2$ and oyxgen and separating the resulting oxygen-18 enriched $KNO_2$ from the $KNO_3$.

METHOD OF PRODUCING COMPOUNDS ENRICHED IN OXYGEN-18

BACKGROUND OF THE INVENTION

This invention was made in the course of, or under, a contract with the United States Atomic Energy Commission.

Our invention relates to methods of altering the isotopic composition of oxygen in oxygen-containing compounds, and more specifically to methods of changing the concentration of oxygen-18 in oxides of nitrogen.

One isotopic separation process uses low-temperature distillation of NO to produce $^{15}N$, $^{17}O$, and $^{18}O$. One problem associated with this process is that of obtaining pure NO feed free from $N_2O$ and $NO_2$, and special steps must be incorporated into a process to remove these impurities. It would be advantageous to furnish NO enriched in one of the desirable product isotopes such as $^{18}O$.

SUMMARY OF THE INVENTION

It is accordingly one object of our invention to provide a method of increasing the oxygen-18 content of an oxide of nitrogen.

It is another object to provide a method of making substantially pure NO enriched in oxygen-18.

Other objects of our invention will become apparent from the following description and the attached claims.

In accordance with our invention we have provided a method of changing the isotopic concentration of oxygen-18 in an oxide of nitrogen comprising irradiating $KNO_3$ containing oxygen-18 and oxygen-16 until at least 10 mole percent of said $KNO_3$ is converted into $KNO_2$ and $O_2$ and separating the resulting oxygen-18 rich $KNO_2$ from the $KNO_3$ and $O_2$.

While $KNO_3$ has previously been irradiated with high-energy radiation converting $KNO_3$ into oxygen-18 enriched $KNO_2$ (see J. Cunningham, J. Phy. Chem. 65, 628 (1961)), no isotopic effect was found beyond 1 percent decomposition of $KNO_3$. In view of the significant cost involved in the separation of $KNO_2$-$KNO_3$ mixture after irradiation, a practicable process for separating oxygen isotopes requires than an isotopic effect exist to a much higher decomposition level than 1 percent, i.e., to at least 10 percent. We have unexpectedly discovered that the isotopic effect in irradiating $KNO_3$ exists not only beyond 1 percent decomposition but in fact exists to greater than 10 percent and probably to 70 percent decomposition of the $KNO_3$.

DESCRIPTION OF THE INVENTION

In carrying out our invention a mass of $KNO_3$ is subjected to penetrating radiation, until at least 10 percent of the $KNO_3$ is decomposed. The radiation dose required to reach this decomposition level is about 1,000 megarads.

The $KNO_3$ is preferably as pure as possible to simplify subsequent separation steps and to minimize nonproductive sorption or radiation.

The source of radiation may be any beta, gamma, X-rays, or alpha particles source. The extent of decomposition of $KNO_3$ is directly proportional to the total absorbed dose, and is not dependent on irradiation rate.

The degree of enrichment of oxygen-18 in the $KNO_2$ produced ranges from a low of 1.06 at a low radiation dose, i.e., 1-2 megarads to a high of 1.18 at a radiation dose of about 8 megarads, tapering off to a level of 1.09 at radiation levels of about 160 megarads and greater.

The temperature at which our process is carried out is not critical and it may suitably range from −198° C. to about the melting temperature of $KNO_3$.

For reasons of economics an irradiation dose of from 1,000 to 2,000 megarads which decomposes 10 to 20 percent of the $KNO_3$ is preferred.

The irradiated mass is processed to separate the oxygen-18 rich $KNO_2$ from the $KNO_3$. The most direct method of separating the $KNO_2$ is by fractional crystallization. The resulting $KNO_2$ can be oxidized to $KNO_3$ and the irradiation step repeated to further enrich the $KNO_3$ in oxygen-18. Each stage will normally increase the concentration of oxygen-18 by 9 to 15 percent.

The $KNO_2$ enriched in oxygen-18 may be decomposed thermally or by known chemical methods to form NO, which is useful as a feed in a low-temperature distillation process for producing nitrogen and oxygen isotopes.

Having thus described our invention the following example is offered to illustrate it in detail.

EXAMPLE

Ten grams of normally enriched $KNO_3$, i.e., containing 0.204 percent $^{18}O$, is irradiated to a level of 1,100 megarads with a cobalt-60 source. The resulting $KNO_2$, weighing approximately 1 gram, is separated from the $KNO_3$ by fractional crystallization at 0° C. The $^{18}O$ concentration in the $KNO_2$ is 0.229 percent. The $KNO_2$ is decomposed to give NO which is oxidized (thermally) with gaseous oxygen enriched in oxygen-18 to $KNO_3$. The resulting $KNO_3$ is irradiated to about 1,100 megarads. The $KNO_2$ formed is separated out and decomposed to NO. The NO formed in this process may be used as a feed in a low-temperature distillation process for separation of nitrogen isotopes as well as for forming oxygen-18 enriched $KNO_3$.

What is claimed is:

1. A method of increasing the oxygen-18 concentration in a compound containing oxygen and nitrogen comprising irradiating a mass of $KNO_3$ with high-energy radiation to an irradiation dosage sufficient to convert at least 10 percent of said $KNO_3$ to $KNO_2$, and separating the resulting $^{18}O$ enriched $KNO_2$ from the irradiated mass.

2. The method of claim 1 wherein the mass of $KNO_3$ is irradiated to a dosage of at least 1,000 megarads.

3. The method of claim 1 wherein the mass of $KNO_3$ is irradiated to a dosage of 1,000 to 2,000 megarads.

4. The method of claim 1 wherein the $^{18}O$ enriched $KNO_2$ is oxidized to $KNO_3$ and the resulting $KNO_3$ is irradiated to produce $KNO_2$ further enriched in $^{18}O$.

5. The method of claim 1 wherein the $^{18}O$ enriched $KNO_2$ is decomposed to form $^{18}O$ enriched NO.

* * * * *